(12) United States Patent
Kim et al.

(10) Patent No.: US 9,277,513 B2
(45) Date of Patent: Mar. 1, 2016

(54) TERMINAL APPARATUS FOR CONTROLLING DOWNLINK TRANSMISSION POWER AND METHOD FOR SAME

(75) Inventors: Dongcheol Kim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/237,466

(22) PCT Filed: Sep. 5, 2012

(86) PCT No.: PCT/KR2012/007107
§ 371 (c)(1),
(2), (4) Date: Feb. 6, 2014

(87) PCT Pub. No.: WO2013/036028
PCT Pub. Date: Mar. 14, 2013

(65) Prior Publication Data
US 2014/0177532 A1   Jun. 26, 2014

Related U.S. Application Data

(60) Provisional application No. 61/531,073, filed on Sep. 5, 2011, provisional application No. 61/554,507, filed on Nov. 2, 2011.

(51) Int. Cl.
*H04W 52/24* (2009.01)
*H04W 52/42* (2009.01)
*H04L 5/00* (2006.01)

(52) U.S. Cl.
CPC ............ *H04W 52/42* (2013.01); *H04W 52/245* (2013.01); *H04L 5/0007* (2013.01); *H04L 5/0053* (2013.01)

(58) Field of Classification Search
None
See application file for complete search history.

(56) References Cited

U.S. PATENT DOCUMENTS

2010/0254471 A1* 10/2010 Ko et al. ........................ 375/260
2011/0141987 A1*  6/2011 Nam et al. .................... 370/329

FOREIGN PATENT DOCUMENTS

| KR | 10-2010-0111608 A | 10/2010 |
| WO | WO 2010/107945 A2 | 9/2010 |
| WO | WO 2011/013986 A2 | 2/2011 |

* cited by examiner

*Primary Examiner* — Christine Duong
(74) *Attorney, Agent, or Firm* — Birch, Stewart, Kolasch & Birch, LLP (57) ABSTRACT

A terminal apparatus for controlling downlink signal transmission power and a method for same are disclosed. The present invention is a method and a terminal apparatus for transmitting downlink transmission power, a method for the base station controlling the downlink transmission power in a wireless communication system comprising the steps of: transmitting a physical downlink shared channel (PDSCH) to the terminal through a carrier comprising orthogonal frequency distribution multiplexing (OFDM) symbols which do not have a cell-specific reference signal (CRS); and transmitting an upper layer parameter for controlling the transmission power of the physical downlink shared channel (PDSCH), wherein the upper layer parameter comprises information on at least one of PDSCH energy per resource element (EPRE), channel state information reference signal (CSI-RS) EPRE, and demodulation reference signal (DM-RS) EPRE.

24 Claims, 8 Drawing Sheets

TERMINAL APPARATUS FOR CONTROLLING DOWNLINK TRANSMISSION POWER AND METHOD FOR SAME

CROSS REFERENCE TO RELATED APPLICATIONS

This non-provisional application is a National Stage entry under U.S.C. §371 of International Application No. PCT/KR2012/007107 filed on Sep. 5, 2012, which claims the benefit of U.S. Provisional Application Nos. 61/531,073 filed on Sep. 5, 2011 and 61/554,507 filed on Nov. 2, 2011. The entire contents of all of the above applications are hereby incorporated by reference.

TECHNICAL FIELD

The present invention relates to a wireless access communication system, and more particularly, to an apparatus and method for controlling transmission power.

BACKGROUND ART

Most important requirements of next-generation wireless access systems are to support high data throughput. For this, a variety of technologies such as MIMO (multiple input multiple output), CoMP (cooperative multiple point transmission), relay, etc. have been developed.

Conventional wireless access systems consider only a single carrier although different bandwidths are configured for uplink and downlink. For example, there has been provided a single carrier based wireless communication system in which uplink and downlink are respectively composed of a single carrier and an uplink bandwidth and a downlink bandwidth are symmetrical.

To secure a wide bandwidth for satisfying higher data throughput in consideration of saturated frequency resources, carrier aggregation (CA) (multiple cells), which aggregates a plurality of dispersed bandwidths and is designed to satisfy basic requirements that independent systems are respectively operated using the bandwidths, has been introduced.

Here, a carrier for a bandwidth, which can be independently operated, is referred to as a component carrier (CC). To support increasing transmission capacity, 3GPP LTE-A or 802.16m extends the bandwidth thereof to 20 MHz or more. In this case, one or more component carriers are aggregated to support a wide bandwidth. For example, if one component carrier supports a bandwidth of 5 MHz, 10 MHz or 20 MHz, a maximum of five component carriers are aggregated to support a system bandwidth of up to 100 MHz.

DISCLOSURE

Technical Problem

An object of the present invention is to provide a base station apparatus for controlling transmission power in order to solve various problems in downlink pathloss estimation, channel estimation, downlink transmission power control, etc. because of absence of the CRS when the CRS isn't includes in a new carrier type.

Another object of the present invention is to provide a base station apparatus for controlling transmission power.

Technical Solution

The object of the present invention can be achieved by providing a method for a base station to control downlink transmission power in a wireless communication system, wherein the method comprises that the base station can solve various problems in downlink pathloss estimation, channel estimation, downlink transmission power control, etc. because of absence of the CRS when the CRS isn't includes in a new carrier type based on information obtained by CSI-RS and DMRS.

Advantageous Effects

According to the method for controlling downlink transmission power, transmission power of a base station can be set when multiple primary cells are present in a carrier aggregation system.

In addition, when additional carriers are different from original carrier type, it is helpful to calculation of downlink power control, pathloss estimation and channel status information feedback.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, even if the following description is made based on a wireless communication system corresponding to 3GPP LTE/LTT-A, the present invention is applicable to other wireless communication systems except for specific features of 3GPP LTE/LTE-A.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, a terminal refers to mobile or fixed user equipment such as UE (user equipment), MS (mobile station), AMS (advanced mobile station), etc. While the present invention is described based on 3GPP LTE/LTE-A, the present invention is applicable to other communication systems.

In a wireless communication system, a UE can receive information through downlink from a base station and transmit information through uplink to the base station. Information transmitted or received by the UE includes data and various types of control information. Various physical channels are present according to types and purposes of information transmitted or received by the UE.

Figure 1:
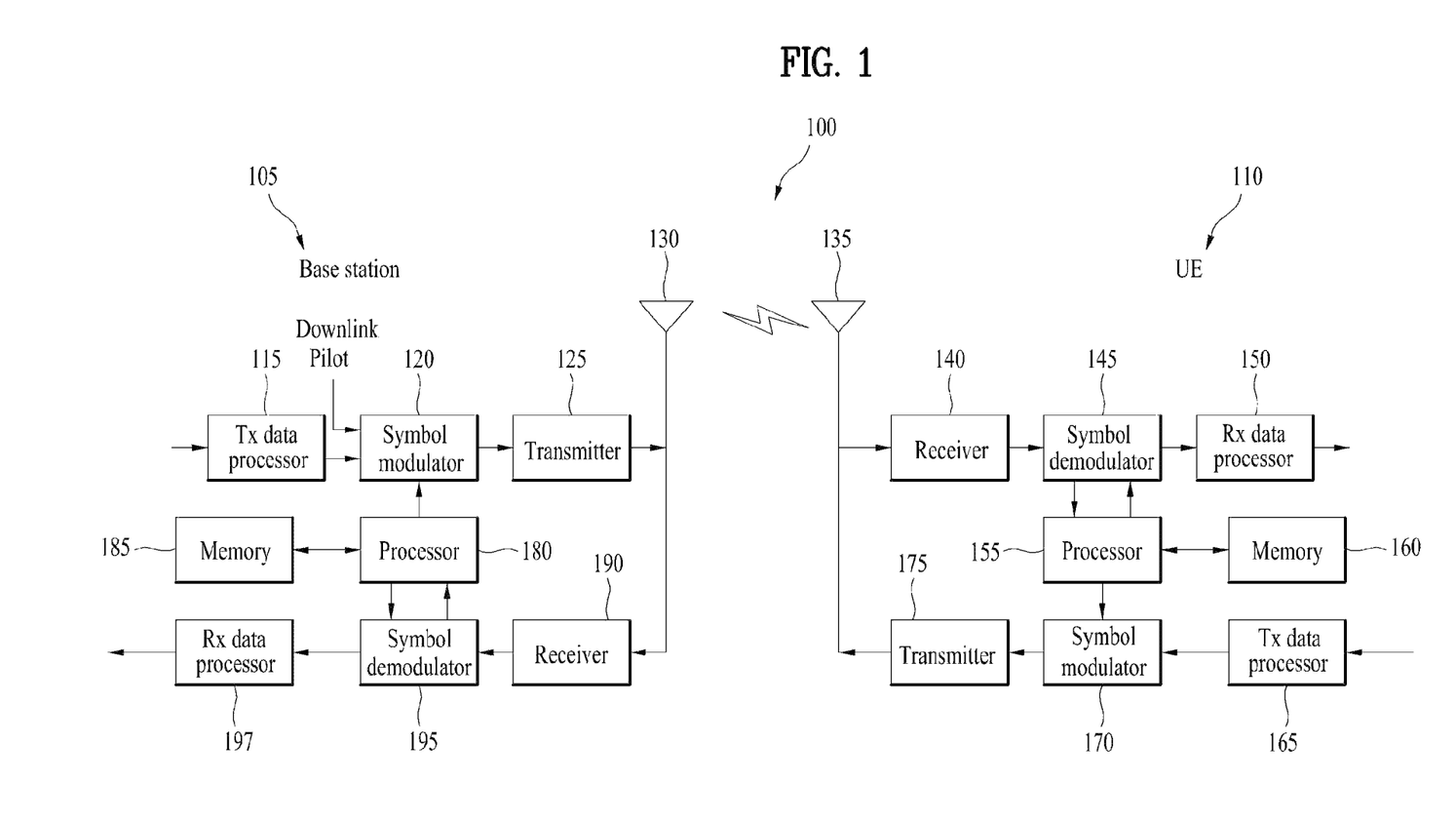
FIG. 1 is a block diagram illustrating configurations of a base station 105 and a terminal 110 in a wireless communication system 100.

FIG. 1 is a block diagram illustrating configurations of a base station (BS) 105 and a UE 110 in a wireless communication system 100.

While one BS 105 and one UE 110 are illustrated in FIG. 1 in order to represent the wireless communication system 100 in a simplified way, the wireless communication system 100 may include one or more BSs and/or one or more UEs.

Referring to FIG. 1, the BS 105 can include a transmission (Tx) data processor 115, a symbol modulator 120, a transmitter 125, a transmit/receive (Tx/Rx) antenna 130, a processor 280, a memory 285, a receiver 290, a symbol demodulator 295 and a reception (Rx) data processor 297. The UE 110 can include a Tx data processor 165, a symbol modulator 170, a transmitter 175, a Tx/Rx antenna 135, a processor 155, a memory 160, a receiver 140, a symbol demodulator 145 and a Rx data processor 150. While the Tx/Rx antennas 130 and 135 are each shown as a single antenna in the BS 105 and the UE 110, the BS 205 and the UE 210 include multiple Tx/Rx antennas. Hence, the BS 105 and the UE 110 according to the present invention support MIMO (Multiple Input Multiple Output). Furthermore, the BS 105 may support both single user-MIMO (SU-MIMO) and multi-user-MIMO (MU-MIMO) in the present invention. On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

The symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the Tx antenna 130.

The UE 110 receives the downlink signal from the BS through the Rx antenna 135 and provides the received downlink signal to the receiver 140. The receiver 140 processes the downlink signal (for example, through filtering, amplification and frequency downconversion) and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the UE 210, the Tx data processor 165 outputs data symbols by processing received traffic data. The symbol modulator 170 multiplexes the data symbols received from the Tx data processor 165 with pilot symbols, modulates the multiplexed symbols and outputs a stream of the symbols to the transmitter 175. The transmitter 175 generates an uplink signal by processing the symbol stream and transmits the uplink signal to the BS 105 through the Tx antenna 135.

The BS 105 receives the uplink signal from the UE 110 through the Rx antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180.

When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 255 and 280.

The layers of radio interface protocols between a UE/BS and a wireless communication system (network) may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the wireless communication network exchange RRC messages through the RRC layer.

Figure 2:
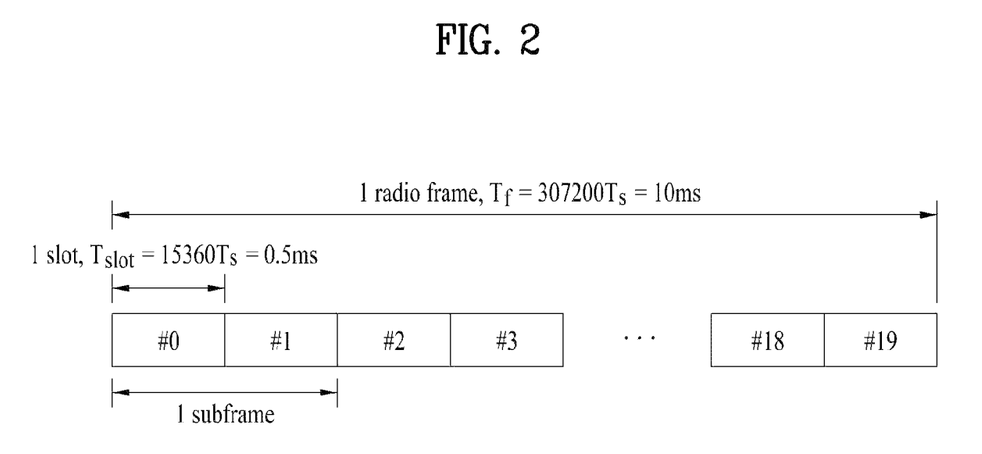
FIG. 2 illustrates a radio frame structure for use in 3GPP LTE.

FIG. 2 illustrates a radio frame structure for use in 3GPP LTE which is a mobile communication system.

Referring to FIG. 2, a radio frame has a duration of 10 ms (327200Ts) and is composed of 10 subframes of equal size. Each subframe is 1 ms in duration and consists of 2 slots. Each slot is 0.5 ms (15360Ts) in duration. Here, Ts is sampling time and is represented by Ts=1/(15 kHz×2048)=3.2552×10$^{-8}$ (about 33 ns). A slot includes a plurality of orthogonal frequency division multiplexing (OFDM) symbols or single carrier-frequency division multiple access (SC-FDMA) symbols in the time domain and includes a plurality of resource blocks (RBs) in the frequency domain.

In LTE, one RB includes 12 subcarrier×7(6) OFDM symbols or SC-FDMA symbols. A transmission time interval (TTI), a unit time for which data is transmitted, can be determined as one or more subframes. The above-described radio frame structure is exemplary and the number of subframes included in a radio frame, the number of slots included in a subframe and the number of OFDM symbols or SC-FDMA symbols included in a slot can be varied.

Figure 3:
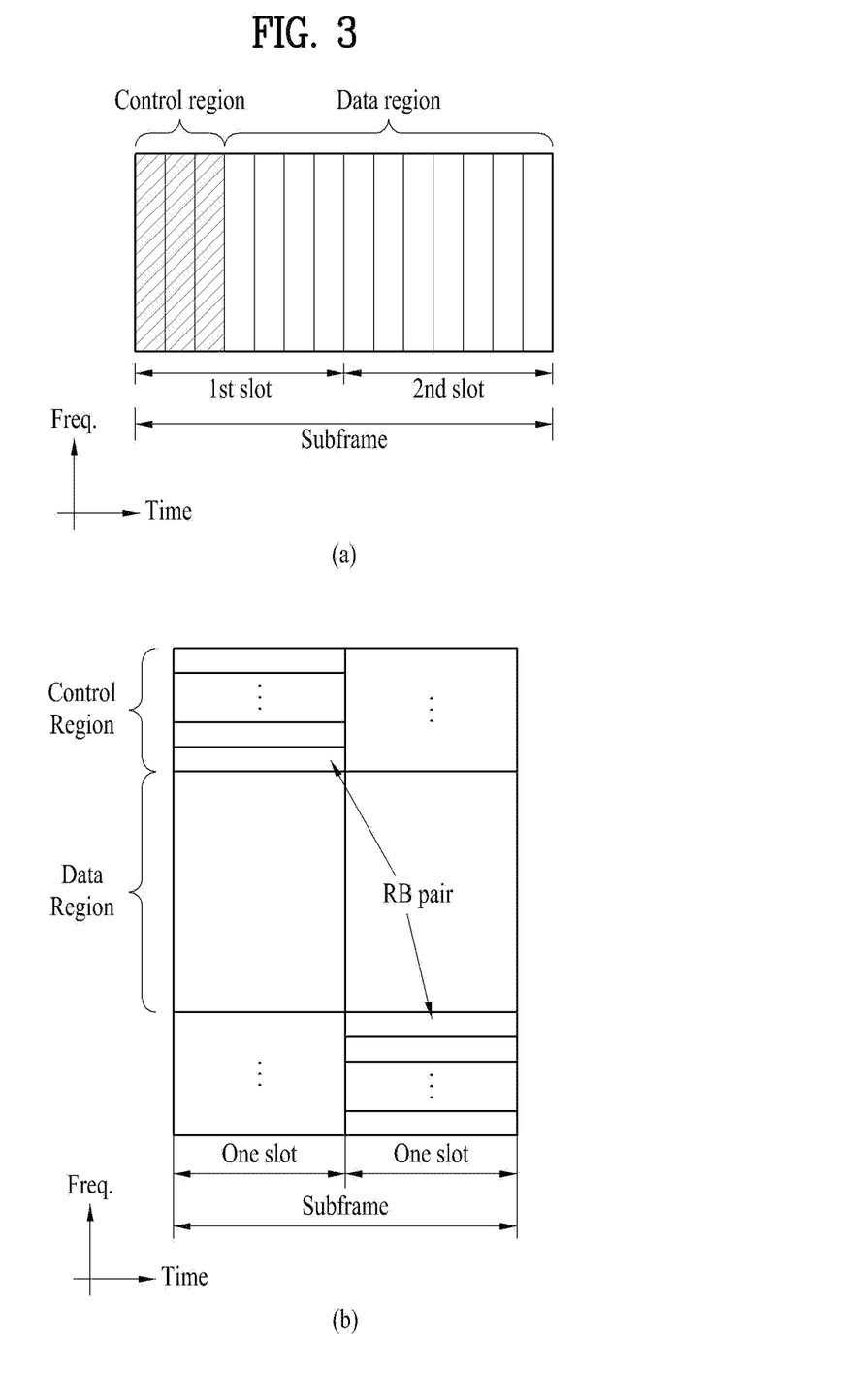
FIG. 3 illustrates a downlink subframe structure and an uplink subframe structure of 3GPP LTE.

FIG. 3 illustrates a downlink subframe structure and an uplink subframe structure of 3GPP LTE which is a mobile communication system.

Referring to FIG. 3(a), a downlink subframe includes 2 slots in the time domain. Three OFDM symbols located at the beginning of the first slot of a downlink subframe correspond to a control region to which control channels are allocated and the remaining OFDM symbols correspond to a data region to which a physical downlink shared channel (PDSCH) is allocated.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols (i.e. control region size) used for transmission of control channels within the subframe. Control information transmitted through the PDCCH is referred to as downlink control information (DCI). The DCI refers to uplink resource allocation information, downlink resource allocation information, an uplink Tx power control command for UE groups, etc. The PHICH carries an acknowledgment(ACK) (ACK)/negative-acknowledgment (NACK) signal for uplink hybrid automatic repeat request (HARQ). That is, an ACK/NACK signal for uplink data transmitted by a UE is transmitted on the PHICH. The PDCCH will now be described.

A BS can transmit, through the PDCCH, resource allocation information and transmission format of a PDSCH (which may be referred to as a DL grant), resource allocation information of a PUSCH (which may be referred to as a UL grant), a set of transmit power control (TPC) commands on individual UEs within an arbitrary UE group, activation of a voice over Internet protocol (VoIP), etc. The BS can transmit a plurality of PDCCHs within a control region and a UE can monitor the PDCCHs. The PDCCH includes an aggregate of one or several consecutive control channel elements (CCEs). The BS can transmit the PDCCH including the aggregate of one or several CCEs in the control region after subblock interleaving of the PDCCH. A CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information carried on the PDCCH is called downlink control information (DCI). Table 1 shows DCI according to DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate uplink transmit power control (TPC) command for UE groups. DCI formats 3/3A include TPC commands for a plurality of UEs. In the case of DCI formats 3/3A, a BS masks CRC with TPC-ID. The TPC-ID is an identifier demasked by a UE to monitor a PDCCH carrying a TPC command. The TPC-ID is used for the UE to decode the PDCCH in order to check whether the TPC command is carried on the PDCCH. The TPC-ID may be defined by reusing the existing identifier such as C-RNTI (radio network temporary identifier), PI-RNTI, SC-RNTI or RA-RNTI or defined as a new identifier. The TPC-ID is distinguished from the C-RNTI for a specific UE and the PI-RNTI, SC-RNTI and RA-RNTI for all UEs in a cell since the TPC-ID is an identifier for UEs belonging to a specific set in a cell. This is because only N UEs can receive TPC commands therefor if DCI includes the TPC commands for the N UEs. If the DCI includes TPC commands for all UEs in a cell, the TPC-ID becomes an identifier for all UEs in the cell.

A UE searches a search space in a subframe for the TPC-ID by monitoring a set of PDCCH candidates. Here, the UE may search a common search space or a UE-specific search space for the TPC-ID. The common search space refers to a search space searched by all UEs in a cell whereas the UE-specific search space refers to a search space searched by a specific UE. If the TPC-ID is demasked for a corresponding PDCCH candidate and thus a CRC error is not detected, the UE can receive a corresponding TPC command on the PDCCH.

TPC-ID for a PDCCH that carries a plurality of TPC commands is defined. Upon detection of the TPC-ID, a UE receives a TPC command on a PDCCH corresponding to the TPC-ID. The TPC command is used to control uplink channel transmit power. Accordingly, it is possible to prevent failure of transmission to a BS or interference to other UEs due to wrong power control.

A method of mapping resources by a BS for PDCCH transmission in an LTE system is described briefly.

In general, the BS can transmit scheduling allocation information and other control information through a PDCCH. A physical control channel may be transmitted through an aggregation of one or more contiguous CCEs. A CCE includes 9 resource element groups (REGs). The number of REGs which are not allocated to a PCFICH or PHICH is represented by NREG. CCEs that can be used in the system correspond to 0 to NCCE-1 (here, $N_{CCE} = \lfloor N_{REG}/9 \rfloor$). A PDCCH supports multiple formats as shown in the following table 2. A PDCCH composed of n contiguous CCEs starts from a CCE that performs i mod n=0 (here, i is a CCE number). Multiple PDCCHs may be transmitted through one subframe.

TABLE 2

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the BS can determine a PDCCH format on the basis of the number of regions in which the BS will transmit control information. A UE can reduce overhead by reading the control information on a CCE basis.

Referring to FIG. 3(b), an uplink subframe can be divided in the frequency domain into a control region and a data region. The control region is allocated a PUCCH for carrying uplink control information. The data region is allocated a PUSCH for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. The RB pair allocated to the PUCCH is frequency-hopped in a slot boundary.

Figure 4:
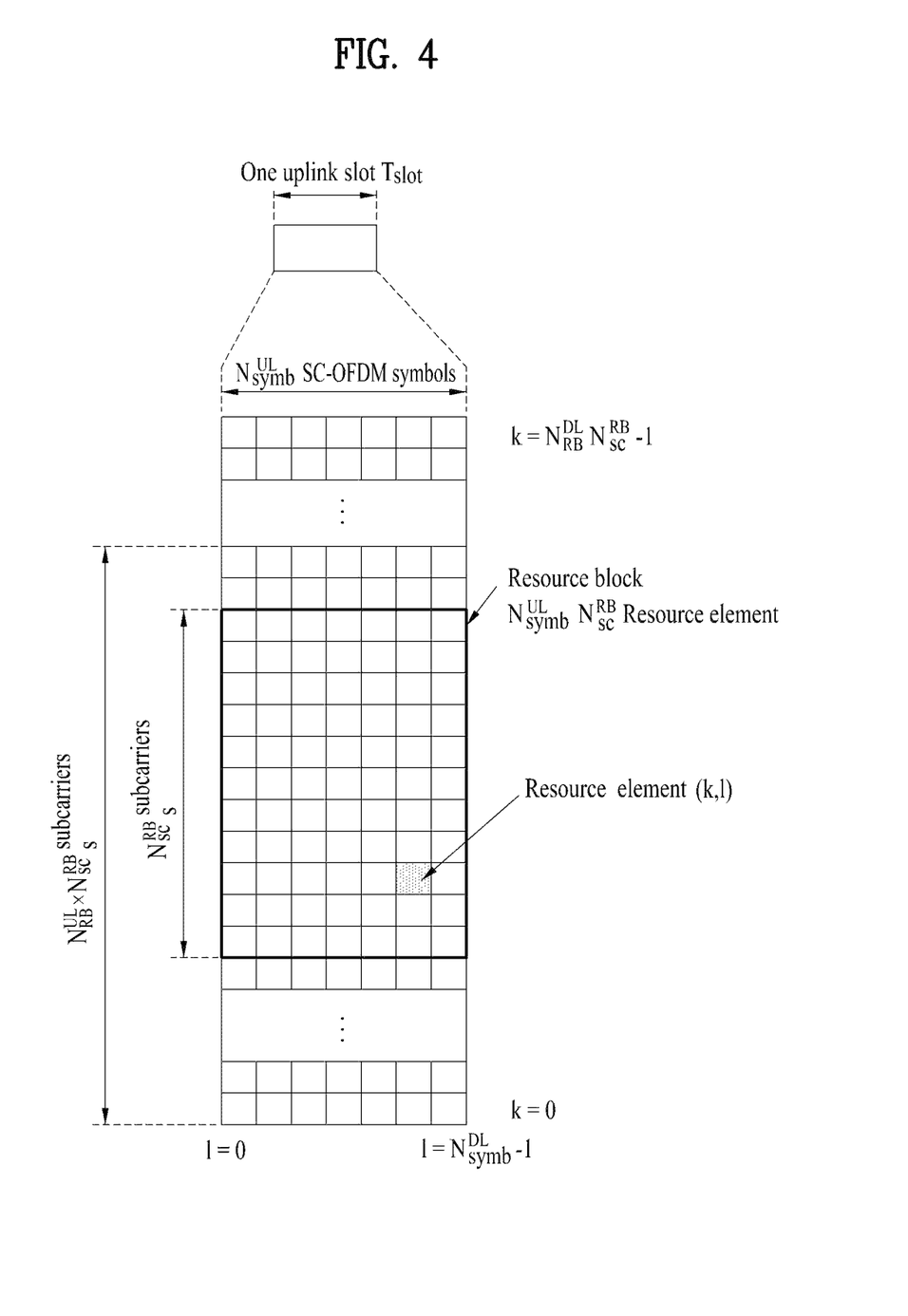
FIG. 4 illustrates a time-frequency resource grid structure of downlink in 3GPP LTE.

FIG. 4 shows a downlink time-frequency resource grid structure used in 3GPP LTE.

A downlink signal transmitted in each slot may be described by a resource grid including $N_{RB}^{DL} \times N_{SC}^{RB}$ subcarriers and $N_{symb}^{DL}$ OFDM symbols. $N_{RB}^{DL}$ indicates the number of downlink resource blocks (RBs), $N_{SC}^{RB}$ represents the number of subcarriers which configure one RB, and $N_{symb}^{DL}$ indicates the number of OFDM symbols in one downlink slot. $N_{RB}^{DL}$ depends on a downlink transmission bandwidth set in a corresponding cell and needs to satisfy $N_{RB}^{min,DL} \leq N_{RB}^{DL} \leq N_{RB}^{max,DL}$. Here, $N_{RB}^{min,DL}$ indicates a minimum downlink bandwidth supported by a wireless communication system, and $N_{RB}^{max,RB}$ represents a maximum downlink bandwidth supported by the wireless communication system. While $N_{RB}^{min,DL}$ may be 6 and $N_{RB}^{max,RB}$ may be 110, they are not limited thereto. The number of OFDM symbols included in one slot may depend on the length of cyclic prefix (CP) and a subcarrier interval. In case of multi-antenna transmission, one resource grid can be defined per antenna port.

An element in the resource grid for each antenna port is called a resource element (RE) and uniquely identified by an index pair (k, l) in a slot. Here, k indicates a frequency-domain index ranging from 0 to $N_{RB}^{DL} N_{SC}^{RB} - 1$ and l indicates a time-domain index ranging from 0 to $N_{symb}^{DL} - 1$.

A RB shown in FIG. 4 is used to describe the mapping relationship between a physical channel and REs. RBs may be classified into a physical RB (PRB) and a virtual RB (VRB). One PRB is defined as $N_{symb}^{DL}$ consecutive OFDM symbols in the time domain and $N_{SC}^{RB}$ consecutive subcarriers in the frequency domain. Here, $N_{symb}^{DL}$ and $N_{SC}^{RB}$ may be predetermined values. For example, $N_{symb}^{DL}$ and $N_{SC}^{RB}$ may have values as shown in the following table 3. Accordingly, one PRB includes $N_{symb}^{DL} \times N_{SC}^{RB}$ REs. While one PRB can correspond to one slot in the time domain and correspond to 180 kHz in the frequency domain, it is not limited thereto.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

One PRB has a value in the range of 0 to $N_{RB}^{DL} - 1$ in the frequency domain. The relationship between a PRB number $n_{PRB}$ in the frequency domain and a resource element (k, l) in one slot satisfies $$n_{PRB} = \left\lfloor \frac{k}{N_{sc}^{RB}} \right\rfloor.$$

The VRB has a size equal to the PRB. The VRB can be classified into a localized VRB (LVRB) and a distributed VRB (DVRB). For each VRB type, a pair of VRBs in two slots of one subframe are allocated with a single VRB number $n_{VRB}$.

The VRB may have a size equal to the PRB. The VRB is classified into a LVRB and a DVRB. For each of the LVRB and DVRB, a pair of VRB having a single VRB index (which may be referred to as a VRB number) are allocated to two slots in one subframe. In other words, $N_{RB}^{DL}$ VRBs which belong to the first one of two slots in one subframe are allocated one of indexes in the range of 0 to $N_{RB}^{DL} - 1$, and $N_{RB}^{DL}$ VRBs which belong to the second slot are also allocated one of the indexes in the range of 0 to $N_{RB}^{DL} - 1$.

A description will be given of a procedure through which a BS transmits a PDCCH to a UE in LTE.

The BS determines a PDCCH format according to DCI to be transmitted to the UE and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information, a system information RNTI (SI-RNTI) may be masked to the CRC. When the PDCCH is for a random access response, a random access-RNTI (RA-RNTI) may be masked to the CRC. Table 4 shows examples of identifiers masked to the PDCCH.

TABLE 4

| Type | Identifier | Description |
|---|---|---|
| UE-specific | C-RNTI | used for the UE corresponding to the C-RNTI. |

TABLE 4-continued

| Type | Identifier | Description |
|---|---|---|
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

The PDCCH carries control information for a specific UE corresponding thereto if the C-RNTI is used and carries common control information received by all UEs or a plurality of UEs in a cell if other RNTIs are used. The BS performs channel coding on the DCI to which the CRC is attached to generate coded data. Then, the BS performs rate matching based on the number or CCEs allocated to the PDCCH format. Subsequently, the BS modulates the coded data to generate modulated symbols and maps the modulated symbols to physical resource elements.

Figure 5:
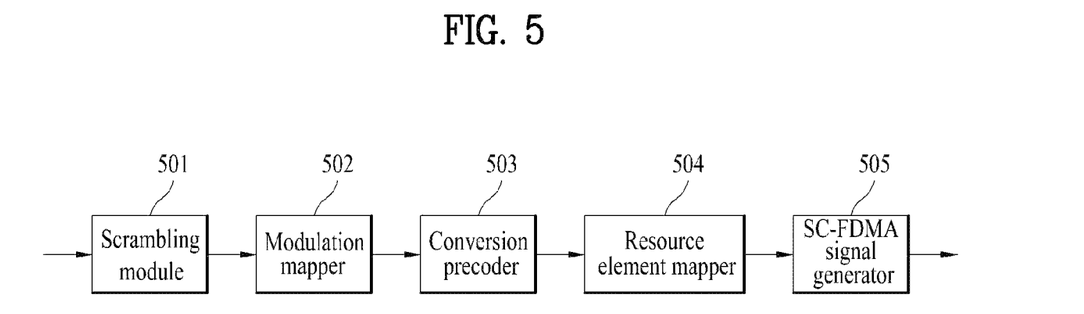
FIG. 5 illustrates a signal processing procedure through which a terminal transmits an uplink signal.

FIG. 5 illustrates a signal processing procedure through which a UE transmits an uplink signal.

Referring to FIG. 5, a scrambling module 501 of the UE may scramble a transmission signal using a UE-specific scrambling signal in order to transmit the uplink signal. The scrambled signal is input to a modulation mapper 502 is modulated into complex symbols using binary phase shift keying (BPSK), quadrature phase shift keying (QPSK) or 16-quadrature amplitude modulation (16QAM)/64QAM on the basis of transmission signal type and/or channel state. The complex symbols are processed by a transform precoder 503 and then applied to a resource element mapper 504. The resource element mapper 504 can map the complex symbols to time-frequency resource elements. The signal processed in this manner can pass through a SC-FDMA signal generator 550 and then transmitted to the BS through an antenna.

A description will be given of PUCCH formats and uplink transmit power of UEs, defined in LTE Release-8. A PUCCH carries uplink control information. In LTE, a UE cannot simultaneously transmit the PUCCH and a PUSCH due to the single carrier property. In LTE-A, however, the UE may simultaneously transmit the PUCCH and the PUSCH through a specific component carrier (e.g. a primary component carrier or PCell) according to introduction of multiple carriers. The PUCCH supports a plurality of formats and PUCCH formats supported in LTE Release-8 are shown in the following table 5. PUCCH formats 2a and 2b support normal CP only.

TABLE 5

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Equation 1 represents uplink Tx power for uplink control channel transmission of a UE in LTE Release-8 in dBm.

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$ [Equation 1]

Here, i indicates a subframe index, $P_{CMAX}$ represents maximum Tx power of the UE, $P_{O\_PUCCH}$ is a parameter including the sum of cell-specific parameters and is signaled by a BS through higher layer signaling, PL is a downlink pathloss (or signal loss) estimate calculated in dB by the UE and is represented as PL=referenceSignalPower-higher layer filteredRSRP. In addition, h(n) is a value varying according to PUCCH format, $n_{CQI}$ is number information bit for channel quality information (CQI) and $n_{HARQ}$ indicates the number of HARQ bits. $\Delta_{F\_PUCCH}(F)$ represents is a relative value for PUCCH format 1a, corresponds to PUCCH format (F) and is signaled by the BS through higher layer signaling, and g(i) indicates a current PUCCH power control adjustment state of a subframe with index i. Furthermore, $h(n_{CQI}, n_{HARQ})$ is 0 in PUCCH formats 1, 1a and 1b and can be represented by Equation 2 in the case of normal CP.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases}$$ [Equation 2]

Table 6 shows $\delta_{PUCCH}$ mapped to TPC command fields in DCI formats 1A/1B/1D/1/2A/2/3 and Table 7 shows $\delta_{PUCCH}$ mapped to TPC command fields in DCI format 3A. Here, $\delta_{PUCCH}$ represents a UE-specific correction value (or power correction value).

TABLE 6

| TPC Command Field in DCI format 1A/1B/1D/1/2A/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

FIGS. 6(a) to 8(b) illustrate multiple carriers of a BS and multiple carriers of a UE.

Environments considered in the present invention include general multi-carrier supporting environments. That is, a multi-carrier system or a carrier aggregation system described in the present invention refers to a system using an aggregate of one or more carriers each having a bandwidth narrower than a target bandwidth to support a wide band. When one or more carriers each having a bandwidth narrower than the target bandwidth are aggregated, the bandwidths of aggregated carriers may be limited to the bandwidth used in the legacy IMT systems for backward compatibility with the legacy IMT system. For example, 3GPP LTE supports {1.4, 3, 5, 10, 15, 20}MHz and LTE-A supports bandwidths wider than 20 MHz only using the bandwidths supported by LTE. Alternatively, a new bandwidth may be defined to support carrier aggregation irrespective of bandwidths used in legacy systems.

The term 'multiple carriers' can be used interchangeably with carrier aggregation and bandwidth (BW) aggregation.

Carrier aggregation includes contiguous carrier aggregation, non-contiguous carrier aggregation and spectrum aggregation.

A description will be given of a scheme of managing multiple carriers by one MAC in order to efficiently use the multiple carriers. A transmitter and a receiver for the scheme are respectively shown in FIG. 6(a) and FIG. 6(b). For effective transmission/reception of the multiple carriers, both the transmitter and receiver need to transmit/receive multiple carriers.

Figure 6A:
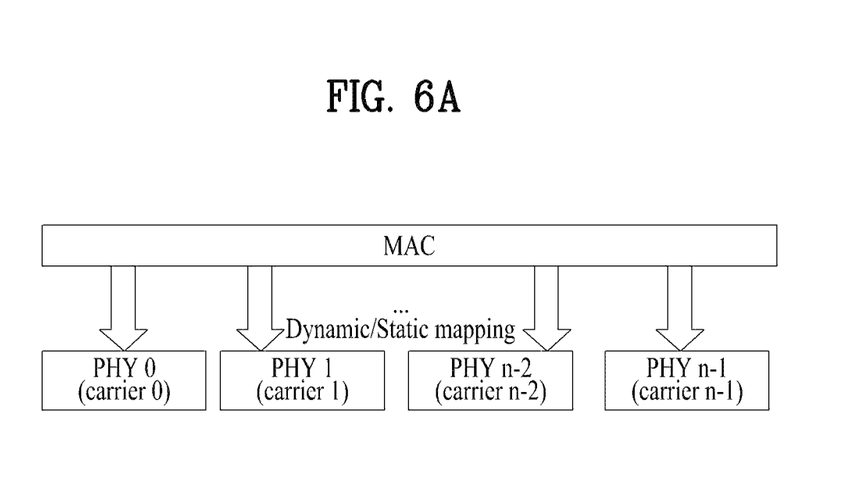
FIG. 6(a) illustrates multiple carriers of a base station.
Figure 6B:
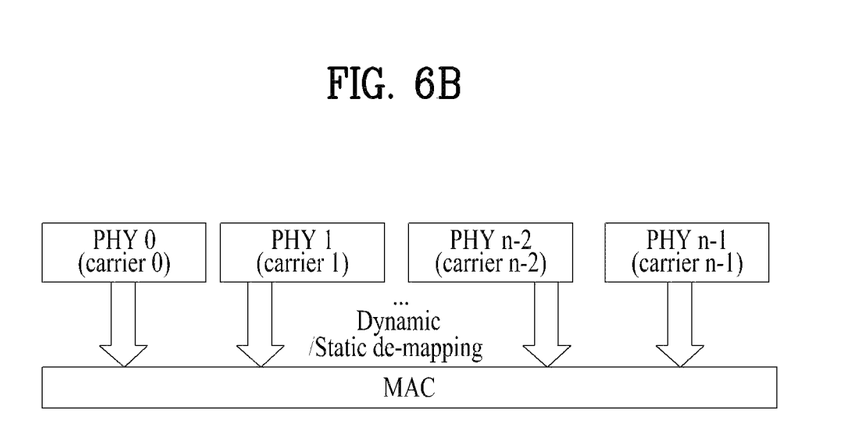
FIG. 6(b) illustrates multiple carriers of a terminal.

One MAC manages/operates and transmits/receives one or more frequency carriers. Since the frequency carriers managed by one MAC need not be contiguous, resource management is flexible. Both contiguous carrier aggregation and non-contiguous aggregation can be performed.

In addition to the scheme illustrated in FIGS. 6(a) and 6(b), multiple MACs may control multiple PHYs, as shown in FIGS. 7(a), 7(b), 8(a) and 8(b).

Figure 7A:
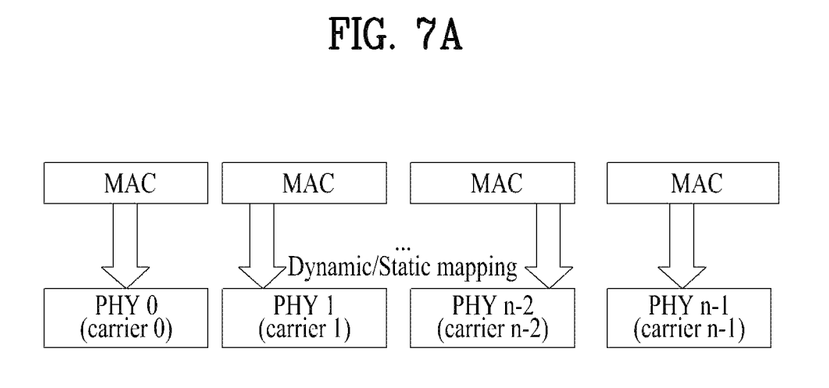
FIG. 7(a) illustrates multiple carriers of a base station.
Figure 7B:
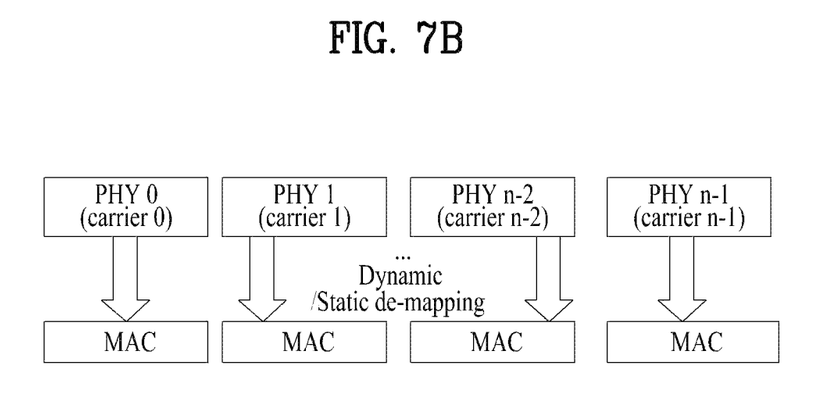
FIG. 7(b) illustrates multiple carriers of a terminal.
Figure 8A:
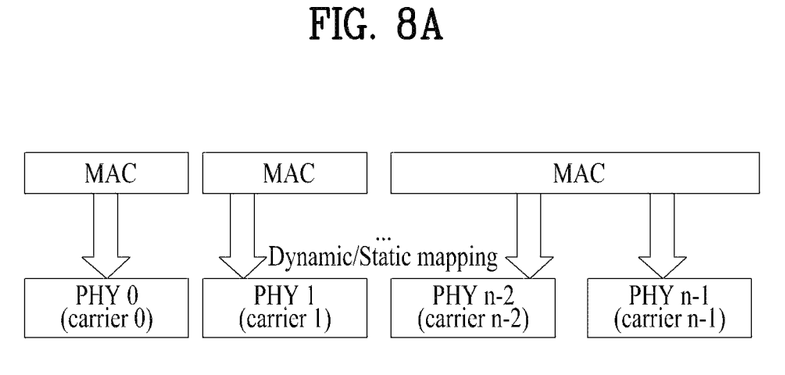
FIG. 8(a) illustrates multiple carriers of a base station.
Figure 8B:
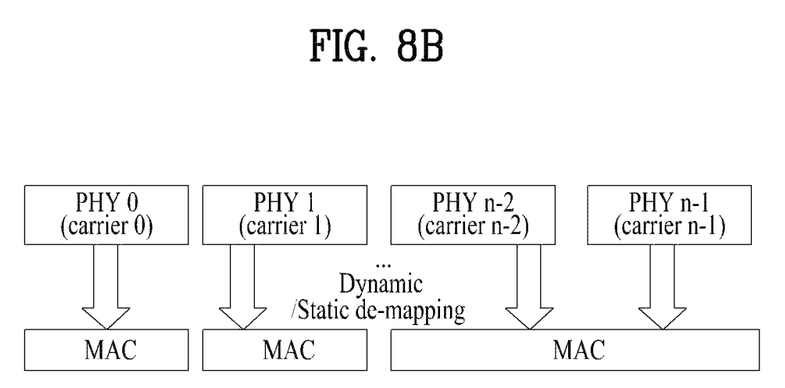
FIG. 8(b) illustrates multiple carriers of a terminal.

The multiple MACs may one-to-one control multiple carriers, as shown in FIGS. 7(a) and 7(b), and MACs may one-to-one control some carriers and one MAC may control the remaining carriers, as shown in FIGS. 8(a) and 8(b).

The above-described system is a system including 1 to N carriers and the carriers can be used contiguously or non-contiguously. This can be applied to both uplink and downlink. In a TDD system, N carriers are operated while each carrier is used for DL and UL transmission. In the case of an FDD system, multiple carriers can be used for each of uplink and downlink. In LTE Rel-8, transmission/reception in a single carrier is supported while uplink and downlink may have different bandwidths. In LTE-A, however, multiple carriers can be operated through carrier aggregation, as described above. In addition, the FDD system can also support asymmetric carrier aggregation in which uplink and downlink have different numbers of aggregated carriers and/or different carrier bandwidths.

However, the present invention may be designed with functions of conventional carriers omitted according to definition of a carrier type to be additionally used with conventional systems. For example, a new carrier type can be designed without a cell-specific reference signal (CRS). However, absence of the CRS may cause various problems in downlink pathloss estimation, channel estimation, downlink transmission power control, etc.

Among synchronized carriers, a legacy carrier and an additional carrier are synchronized in the time domain and frequency domain. Here, a receiver of a UE needs to perform synchronization.

However, a legacy carrier and an additional carrier among unsynchronized carriers need not be synchronized with the same accuracy as the synchronized carriers.

Accordingly, in the case of downlink carriers, a cell specific reference signal (CRS), a primary synchronization signal (PSS)/secondary synchronization signal (SSS), etc. need to be transmitted together through a component carrier for synchronization when synchronization is required. Unsynchronized carriers need not include the CRS.

However, when the CRS is not included in a carrier of the new type, which needs to be synchronized, synchronization may not be acquired. The new carrier type includes carriers that need synchronization and a carrier including no CRS may be transmitted in order to improve spectrum distribution.

The present invention will be described based on a case in which a carrier that needs to be synchronized and includes no CRS.

When a carrier of the new type includes only a channel status information reference signal (CSI-RS) and a UE-specific reference signal (DM-RS: demodulation-RS) without CRS, a UE has a difficulty in estimating downlink pathloss. Pathloss is obtained as a difference between reference signal power referenceSignalPower and higher layer filtered reference signal received power (RSRP). Reference signal power information about the CRS is signaled to the UE through higher layer signaling, and RSRP and higher layer filtered configuration may be defined for a reference serving cell. The above-described information is configured as a higher layer parameter called pathlossreferencelinking and signaled to the UE.

A BS determines downlink transmission energy per resource element (EPRE) used for downlink transmission. Here, the ratio of PDSCH EPRE to cell-specific RS (i.e. CRS) EPRE is denoted by either $\rho_A$ and $\rho_B$ according to OFDM symbol index. This value is UE-specifically determined. The UE generates CQI on the assumption of $\rho_A$ and $\rho_B$ set by the BS. Here, $\rho_A$ denotes the ratio of PDSCH EPRE to CRS EPRE for an OFDM symbol including no CRS whereas $\rho_B$ represents the ratio of PDSCH EPRE to CRS EPRE for an OFDM symbol including the CRS. The ratio of PDSCH EPRE to CRS EPRE through reference signal power information about the CRS, $\rho_A$ and $\rho_B$, is UE-specifically signaled to achieve cell/UE specific downlink power control. That is, the ratio of PDSCH EPRE to CRS EPRE for an OFDM symbol including no CRS and the ratio of PDSCH EPRE to CRS EPRE for an OFDM symbol including the CRS can be respectively defined as $\rho_A$ and $\rho_B$.

Simultaneously, a cell specific parameter $P_B$ corresponding to $\rho_B/\rho_A$ is signaled to the UE.

Accordingly, when $P_B$, $\rho_A$ and CRS power information are signaled to the UE, the UE can be aware of $\rho_B$ through these values.

That is, the UE can obtain CRS power information, $\rho_A$, $P_B$ and Pc (the ratio of PDSCH EPRE to CRI-RS EPRE) and calculate Rx power from the BS using the same.

The ratio of PDSCH EPRE to CRS EPRE is defined as $\rho_A$ or $\rho_B$ among PDSCH resources for OFDM symbols, as shown in Tables 8 and 9. Here, $\rho_A$ or $\rho_B$ is a UE-specific value.

Table 8 shows OFDM symbol indices within a slot of a non-MBSFN (multicast/broadcast over a single frequency network) subframe according to the ratio of PDSCH EPRE to CRS EPRE, $\rho_A$ or $\rho_B$.

Referring to Table 8, when a normal CP is used and the number of antenna ports is 4, the ratio of PDSCH ERPRE to CRS EPRE for OFDM symbols corresponding to OFDM symbol indices 2, 3, 5 and 6 and including no CRS within a slot is $\rho_A$ and the ratio of PDSCH ERPRE to CRS EPRE for OFDM symbols corresponding to OFDM symbol indices 0, 1 and 4 and including the CRS within a slot is $\rho_B$.

Table 9 shows OFDM symbol indices within a slot of an MBSFN subframe according to the ratio of PDSCH EPRE to CRS EPRE, $\rho_A$ or $\rho_B$.

TABLE 8

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

TABLE 9

| | OFDM symbol indices within a slot where the ratio of the corresponding PDSCH EPRE to the cell-specific RS EPRE is denoted by $\rho_A$ | | | | OFDM symbol indices within a slot where the ratio of the corresponding PDSCH EPRE to the cell-specific RS EPRE is denoted by $\rho_B$ | | | |
|---|---|---|---|---|---|---|---|---|
| | Normal cyclic prefix | | Extended cyclic prefix | | Normal cyclic prefix | | Extended cyclic prefix | |
| Number of antenna ports | $n_s$ mod 2 = 0 | $n_s$ mod 2 = 1 | $n_s$ mod 2 = 0 | $n_s$ mod 2 = 1 | $n_s$ mod 2 = 0 | $n_s$ mod 2 = 1 | $n_s$ mod 2 = 0 | $n_s$ mod 2 = 1 |
| One or two | 1, 2, 3, 4, 5, 6 | 0, 1, 2, 3, 4, 5, 6 | 1, 2, 3, 4, 5 | 0, 1, 2, 3, 4, 5 | 0 | — | 0 | — |
| Four | 2, 3, 4, 5, 6 | 0, 1, 2, 3, 4, 5, 6 | 2, 4, 3, 5 | 0, 1, 2, 3, 4, 5 | 0, 1 | — | 0, 1 | — |

The UE recognizes $\rho_B$ using signaled reference signal power referenceSingalPower, $\rho_A$ and $\rho_B$.

The UE is aware of CRS transmit power, PDSCH EPRE for an OFDM symbol including the CRS and PDSCH EPRE for an OFDM symbol including no CRS using the above-describe information. However, the UE has trouble estimating DL pathloss when the CRS is not present.

To solve this problem, a CSI-RS or DM-RS may be used instead of the CRS.

That is, when the ratio of PDSCH EPRE for an OFDM symbol including the CRS to PDSCH EPRE for an OFDM symbol including no CRS is applied, the CSI-RS instead of the CRS may be used.

For example, PDSCH EPRE for an OFDM symbol including the CSI-RS and PDSCH EPRE for an OFDM symbol including no CSI-RS may be respectively defined as $\rho_A$ and $\rho_B$. In this case, $\rho_B$ may be calculated using a channel state parameter $P_B$ and PDSCH EPRE for an OFDM symbol including the CSI-RS, $\rho_A$, instead of CRS power information.

The following methods may be considered as a method for obtaining information about PDSCH EPRE and/or CSI-RS EPRE and/or DM-RS EPRE.

A first method relates to a case in which an OFDM symbol of a new carrier type includes both the DM-RS and CSI-RS instead of the CRS.

When only the DM-RS and CSI-RS are present, the BS may signal a DM-RS transmit power level through L1/higher layer signaling. Otherwise, the BS may signal a PDSCH transmit power level or a CSI-RS transmit power level through L1/higher layer signaling.

The DM-RS and CSI-RS may be simultaneously transmitted or only one thereof may be transmitted.

According to method 1-1, when DM-RS EPRE is different from PDSCH EPRE, the power ratio of PDSCH EPRE for an OFDM symbol including the DM-RS to PDSCH EPRE for an OFDM symbol including no DM-RS is signaled.

That is, it is possible to obtain PDSCH EPRE for an OFDM symbol including no DM-RS, $\rho_B$, using the power ratio of PDSCH EPRE for an OFDM symbol including no DM-RS to PDSCH EPRE for an OFDM symbol including the DM-RS, $P_B$, by equally applying the concept of the ratio of PDSCH EPRE to CRS EPRE for an OFDM symbol including no CRS or including the CRS, $\rho_A$ or $\rho_B$.

According to method 1-2, when DMRS EPRE is different from CSI-RS EPRE, the power ratio of DMRS EPRE (or PDSCH EPRE) to CSI-RS EPRE needs to be signaled for CSI feedback calculation. It is possible to obtain PDSCH EPRE for an OFDM symbol including no CSI-RS, $\rho_B$, using PDSCH EPRE for an OFDM symbol including the CSI-RS, $\rho_A$, the ratio of $\rho_A$ to $\rho_B$, $P_B$, and the ratio of PDSCH EPRE to CSI-RS EPRE, $P_C$, by equally applying the concept of $\rho_A$ or $\rho_B$ of the CRS.

According to method 1-3, the power ratio of PDSCH EPRE to CSI-RS EPRE may be signaled when DMRS EPRE is different from PDSCH EPRE. A difference between PDSCH EPRE and CSI-RS EPRE instead of the power ratio may be signaled or actual power values may be signaled.

A second method according to the present invention relates to a case in which the OFDM symbol of the new carrier type includes the DM-RS only.

When only the DM-RS is present, the BS signals a DM-RS transmit power level through L1/higher layer signaling. When DM-RS EPRE is different from PDSCH EPRE, the power ratio of PDSCH EPRE $\rho_A$ for an OFDM symbol including the DM-RS to PDSCH EPRE for an OFDM symbol including no DM-RS is signaled. Accordingly, $\rho_B$ can be calculated.

A third method according to the present invention relates to a case in which the OFDM symbol of the new carrier type includes the CSI-RS only.

When only the CSI-RS is present, the BS signals CSI-RS transmit power through L1/higher layer signaling. That is, a CSI-RS transmit power level can be calculated by receiving the power ratio of CSI-RS EPRE to PDSCH EPRE from the BS.

The methods 1, 2 and 3 may be used in a combined manner and only one of the methods may be used as necessary. Accordingly, in the case of a carrier of the new type including no CRS, RSRP needs to be redefined using the above-described methods instead of the CRS. RSRP can be obtained using the DMRS, CSI-RS or PDSCH.

The CSI-RS transmit power level can be calculated by receiving the power ratio of CSI-RS EPRE to PDSCH EPRE from the BS. When no CRS is present, PDSCH EPRE cannot be obtained and thus CSI-RS EPRE cannot be obtained. Accordingly, it is difficult to calculate CSI feedback. In this case, CSI-RS transmit power may be directly signaled or the power ratio of CSI-RS EPRE to PDSCH EPRE or DM-RS EPRE or a difference therebetween may be signaled. Specifically, the PDSCH transmit power level as a power distribution linear value is a power value of all resource elements carrying UE-specific PDSCHs within a UE-specific allocation bandwidth. The PDSCH transmit power level needs to be signaled to the UE. PDSCH EPRE can be calculated using the PDSCH transmit power level and the UE can obtain RNTP using PDSCH EPRE and report the RNTP to the BS. In addition, CSI-RS EPRE can also be obtained. The BS can signal the ratio of CSI-RS EPRE to PDSCH EPRE, Pc, to the UE.

According to method 4-1, a method for the UE to obtain PDSCH EPRE when RSRP and/or RSRQ (reference signal received quality) can be estimated or not on a DL subframe/radio frame basis may be considered. To obtain PDSCH EPRE by the UE, a conventional method may be used or a new method may be introduced to obtain RSRP and/RSRQ. However, to obtain RSRP and/or RSRQ irrespective of this method, transmit power of a corresponding signal needs to be signaled in order to estimate DL pathloss using RSRP.

According to method 4-2, power control for a UE-specific PDSCH can be performed using the relationship among $\rho_A$, $P_B$ and $\rho_B$ in a subframe (or time unit) in which RSRP and/or RSRQ can be obtained as in the conventional method. In a subframe (or time unit) in which RSRP and/or RSRQ cannot be obtained, a PDSCH transmit power level is signaled. Otherwise, a power difference (or ratio) from a corresponding signal indicating a transmit power level in a subframe in which RSRP and/or RSRQ can be obtained is signaled.

A fifth method sets transmit power values of the DMRS, PDSCH and CSI-RS to the same value and signals the transmit power level of one of the three to the UE through L1 or higher layer signaling.

Alternatively, a component carrier (CC) including a CRS, configured along with an additional carrier, may signal a transmit power level. For example, power ratios with respect to (or difference from) a CRS in a CC including the CRS are signaled. According to this method, it is possible to know the ratio of CRS EPRE to PDSCH EPRE for an OFDM symbol including the CRS or an OFDM symbol including no CRS and the power ratio of PDSCH EPRE to CSI-RS EPRE (or the difference therebetween), obtained using the ratio. Otherwise, a value used in a CC including a CRS, configured along with the additional carrier, may be reused.

The above-described method is applicable irrespective of whether the additional carrier is present within an intra-band or inter-band.

That is, when the additional carrier is designed as an OFDM symbol including no CRS, differently from the conventional carrier type according to the above-described method, downlink power can be calculated using the CSI-RS or DM-RS instead of CRS and RSRP and/or RSRQ. This downlink power calculation aids in downlink power control, pathloss estimation and CSI feedback calculation.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A BS apparatus and method for controlling Tx power are applicable to various communication systems such as 3GPP LTE, LTE-A, IEEE 802, etc.

The invention claimed is:

1. A method for controlling downlink transmit power of a downlink signal transmitted from a base station (BS), the method comprising:

transmitting, to a user equipment (UE) a power parameter for controlling transmit power of a physical downlink shared channel (PDSCH); and transmitting, to the UE, the PDSCH using the transmit power of the PDSCH, wherein the PDSCH is included in a first type carrier that needs synchronization, wherein the first type carrier is an additional carrier used with a legacy carrier and includes a channel state information reference signal (CSI-RS) and a demodulation reference signal (DMRS), and does not include a cell-specific reference signal (CRS), wherein the power parameter includes at least one of a PDSCH energy per resource element (EPRE), a CSI-RS EPRE and a DMRS EPRE, and wherein the power parameter is calculated based on an orthogonal frequency distribution multiplexing (OFDM) symbol having a reference signal including at least one of a CSI-RS and a DMRS and an OFDM symbol including no reference signal.

2. The method according to claim 1, wherein, when the reference signal is at least one of the CSI-RS and DMRS, at least one of a CSI-RS transmit power level or a DMRS transmit power level is signaled to the UE such that the power parameter includes the CSI-RS EPRE calculated based on the OFDM symbol including the CSI-RS and the OFDM symbol including no CSI-RS.

3. The method according to claim 2, wherein, when the CSI-RS EPRE is different from the DMRS EPRE, the power parameter includes a power ratio of the CSI-RS EPRE to the DMRS EPRE.

4. The method according to claim 1, wherein, when the PDSCH EPRE is different from the DMRS EPRE, the power parameter includes a power ratio of PDSCH EPRE for an OFDM symbol including a DMRS to PDSCH EPRE for an OFDM symbol including no DMRS or the difference therebetween.

5. The method according to claim 1, wherein DMRS transmit power level information is signaled to the UE when the reference signal corresponds to the DMRS, and the power parameter includes a power ratio of PDSCH EPRE for an OFDM symbol including the DMRS to PDSCH EPRE for an OFDM symbol including no DMRS or the difference therebetween when the PDSCH EPRE is different from the DMRS EPRE.

6. The method according to claim 1, wherein the power parameter includes CSI-RS transmit power level information when the reference signal corresponds to the CSI-RS.

7. A method for a UE to receive downlink transmit power control information on a downlink signal, the method comprising:
receiving, from a base station (BS), a power parameter for controlling transmit power of a physical downlink shared channel (PDSCH); and
receiving, from the BS, the PDSCH using the transmit power of the PDSCH,
wherein the PDSCH is included in a first type carrier that needs synchronization,
wherein the first type carrier is an additional carrier used with a legacy carrier and includes a channel state information reference signal (CSI-RS) and a demodulation reference signal (DMRS), and does not include a cell-specific reference signal (CRS),
wherein the power parameter includes at least one of a PDSCH energy per resource element (EPRE), a CSI-RS EPRE and a DMRS EPRE, and
wherein the power parameter is calculated based on an orthogonal frequency distribution multiplexing (OFDM) symbol having a reference signal including at least one of a CSI-RS and a DMRS and an OFDM symbol including no reference signal.

8. The method according to claim 7, wherein, when the reference signal is at least one of the CSI-RS and DMRS, at least one of a CSI-RS transmit power level or a DMRS transmit power level is signaled by the BS such that the power parameter includes the CSI-RS EPRE calculated based on the OFDM symbol including the CSI-RS and the OFDM symbol including no CSI-RS.

9. The method according to claim 8, wherein, when the CSI-RS EPRE is different from the DMRS EPRE, the power parameter includes a power ratio of the CSI-RS EPRE to the DMRS EPRE.

10. The method according to claim 7, wherein, when the PDSCH EPRE is different from the DMRS EPRE, the power parameter includes a power ratio of PDSCH EPRE for an OFDM symbol including a DMRS to PDSCH EPRE for an OFDM symbol including no DMRS or the difference therebetween.

11. The method according to claim 7, wherein DMRS transmit power level information is signaled by the BS when the reference signal corresponds to the DMRS, and the power parameter includes a power ratio of PDSCH EPRE for an OFDM symbol including the DMRS to PDSCH EPRE for an OFDM symbol including no DMRS or the difference therebetween when the PDSCH EPRE is different from the DMRS EPRE.

12. The method according to claim 7, wherein the power parameter includes CSI-RS transmit power level information when the reference signal corresponds to the CSI-RS.

13. A base station (BS) for controlling downlink transmit power of a downlink signal transmitted in a wireless communication system, the BS comprising:
a transmitter;
a processor configured to control the transmitter,
wherein the processor is further configured to control the transmitter to transmit a power parameter for controlling transmit power of a PDSCH to a UE and to transmit the PDSCH to the UE using the transmit power of the PDSCH,
wherein the PDSCH is included in a first type carrier that needs synchronization,
wherein the first type carrier is an additional carrier used with a legacy carrier and includes a channel state information reference signal (CSI-RS) and a demodulation reference signal (DMRS), and does not include a cell-specific reference signal (CRS),
wherein the power parameter includes at least one of a PDSCH energy per resource element (EPRE), CSI-RS EPRE and a DMRS EPRE, and
wherein the power parameter is calculated based on an orthogonal frequency distribution multiplexing (OFDM) symbol having a reference signal including at least one of a CSI-RS and a DMRS and an OFDM symbol including no reference signal.

14. The BS according to claim 13, wherein, when the reference signal is at least one of the CSI-RS and DMRS, at least one of a CSI-RS transmit power level or a DMRS transmit power level is signaled to the UE such that the power parameter includes the CSI-RS EPRE calculated based on the OFDM symbol including the CSI-RS and the OFDM symbol including no CSI-RS.

15. The BS according to claim 14, wherein, when the CSI-RS EPRE is different from the DMRS EPRE, the power parameter includes a power ratio of the CSI-RS EPRE to the DMRS EPRE.

16. The BS according to claim 13, wherein, when the PDSCH EPRE is different from the DMRS EPRE, the power parameter includes a power ratio of PDSCH EPRE for an OFDM symbol including a DMRS to PDSCH EPRE for an OFDM symbol including no DMRS or the difference therebetween.

17. The BS according to claim 13, wherein DMRS transmit power level information is signaled when the reference signal corresponds to the DMRS, and the power parameter includes a power ratio of PDSCH EPRE for an OFDM symbol including the DMRS to PDSCH EPRE for an OFDM symbol including no DMRS or the difference therebetween when the PDSCH EPRE is different from the DMRS EPRE.

18. The method according to claim 13, wherein the power parameter includes CSI-RS transmit power level information when the reference signal corresponds to the CSI-RS.

19. A user equipment (UE) for receiving downlink transmit power control information on a downlink signal transmitted, the UE comprising:
a receiver;
a processor configured to control the receiver;
wherein the processor is further configured to control the receiver to receive a power parameter for controlling transmit power of a PDSCH from a BS and to receive the PDSCH from the BS using the transmit power of the PDSCH, wherein the PDSCH is included in a first type carrier that need synchronization, wherein the first type carrier is an additional carrier used with a legacy carrier and includes a channel state information reference signal (CSI-RS) and a demodulation reference signal (DMRS), and does not include a cell-specific reference signal (CRS), wherein the power parameter includes at least one of a PDSCH energy per resource element (EPRE), a CSI-RS EPRE and a DMRS EPRE, and wherein the power parameter is calculated based on an orthogonal frequency distribution multiplexing (OFDM) symbol having a reference signal including at least one of a CSI-RS and a DMRS and an OFDM symbol including no reference signal.

20. The UE according to claim 19, wherein, when the reference signal is at least one of the CSI-RS and DMRS, at least one of a CSI-RS transmit power level or a DMRS transmit power level is signaled by the BS such that the power parameter includes the CSI-RS EPRE calculated based on the OFDM symbol including the CSI-RS and the OFDM symbol including no CSI-RS.

21. The UE according to claim 20, wherein, when the CSI-RS EPRE is different from the DMRS EPRE, the power parameter includes a power ratio of the CSI-RS EPRE to the DMRS EPRE.

22. The UE according to claim 19, wherein, when the PDSCH EPRE is different from the DMRS EPRE, the power parameter includes a power ratio of PDSCH EPRE for an OFDM symbol including a DMRS to PDSCH EPRE for an OFDM symbol including no DMRS or the difference therebetween.

23. The UE according to claim 19, wherein DMRS transmit power level information is signaled by the BS when the reference signal corresponds to the DMRS, and the power parameter includes a power ratio of PDSCH EPRE for an OFDM symbol including the DMRS to PDSCH EPRE for an OFDM symbol including no DMRS or the difference therebetween when the PDSCH EPRE is different from the DMRS EPRE.

24. The UE according to claim 19, wherein the power parameter includes CSI-RS transmit power level information when the reference signal corresponds to the CSI-RS.

* * * * *